Jan. 13, 1942. W. H. REA ET AL 2,270,222

FLUID BRAKE

Filed June 23, 1941  3 Sheets-Sheet 1

Inventors
William H. Rea &
Arthur W. Weeks.

By A. Yates Dowell
Attorney

Jan. 13, 1942.                W. H. REA ET AL                2,270,222
                                 FLUID BRAKE
                            Filed June 23, 1941          3 Sheets-Sheet 2

Inventors
William H. Rea and
Arthur W. Weeks,

By A. Yates Dowell
   Attorney

Jan. 13, 1942.  W. H. REA ET AL  2,270,222
FLUID BRAKE
Filed June 23, 1941   3 Sheets-Sheet 3

Inventors
William H. Rea and
Arthur W. Weeks.

Patented Jan. 13, 1942

2,270,222

UNITED STATES PATENT OFFICE 2,270,222

FLUID BRAKE

William Herbert Rea and Arthur William Weeks, Glenburnie, Md., assignors, by direct and mesne assignments, of one-half to said Rea and one-half to James H. Easton, Baltimore, Md.

Application June 23, 1941, Serial No. 399,380

14 Claims. (Cl. 188—92)

This invention relates to fluid brakes of the internal resistance rotary gear type utilizing pump gears which are generally driven by a rotating member, such as the drive shaft of a motor-powered vehicle, to generate reversely acting fluid pressure and retard rotation of said member.

Brakes of this type have long been proposed and many and various constructions have been suggested, but the main objection to commercial development and acceptance by the industry has apparently been the leakage or pressure loss between relatively moving parts and which resulted in such low efficiency rating as to render the brake impracticable.

An object of the present invention is to provide a brake of the type specified wherein leakage and consequent pressure losses are reduced to a minimum, so that the brake will operate at a high rate of efficiency. More specifically, the invention contemplates a fluid brake of the internal resistance rotary gear pump type wherein the pump gears which generate the pressure in the pressure chamber are provided with movable sealing members operating to effect a seal between the gear and its enclosed housing, the sealing pressure being applied in direct proportion to the pressure generated in the pressure chamber.

A further object is to provide a rotary gear type internal fluid brake of relatively simple construction and design which is capable of generating practically unlimited braking pressure.

The foregoing and other objects and advantages will become apparent in view of the following description taken in conjunction with the drawings, wherein.

Figure 1:
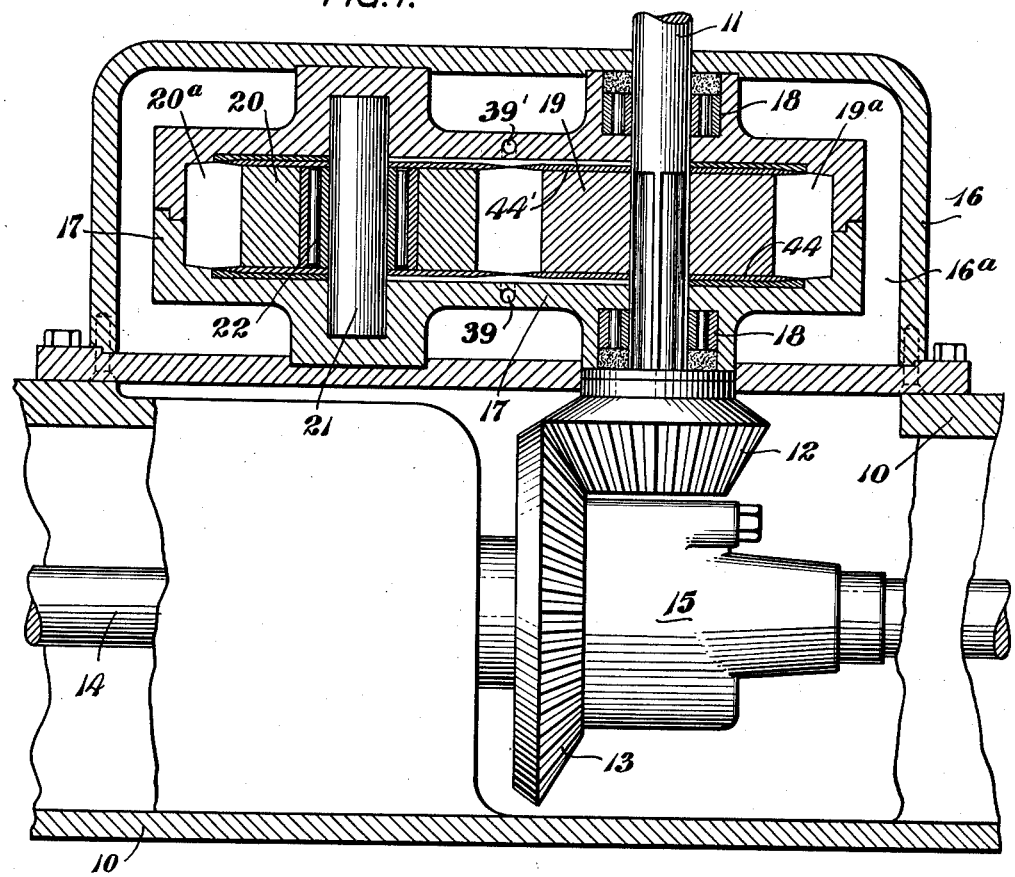
Fig. 1 is a horizontal section taken through the differential housing of a motor vehicle illustrating a fluid brake unit in accordance with the invention operatively connected thereto.
Figure 7:
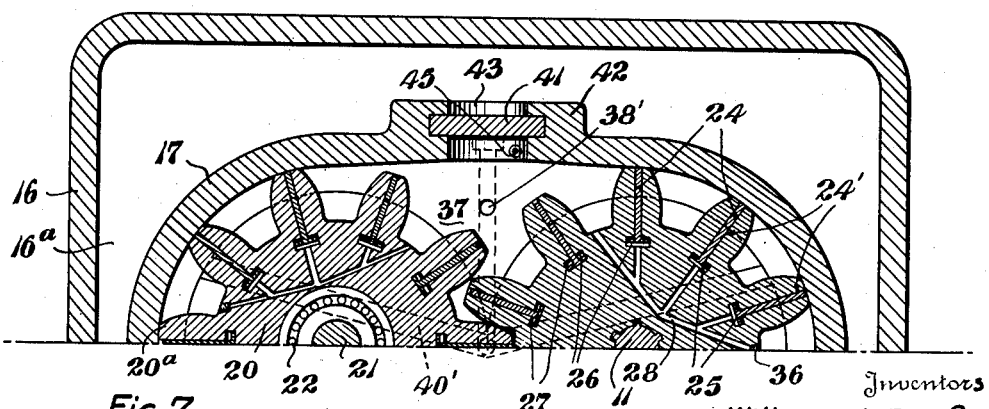
Fig. 7 is an enlarged view of the upper portion of Fig. 3.
Figure 2:
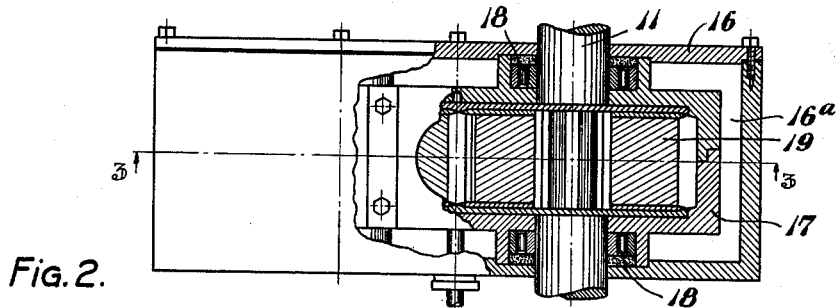
Fig. 2 is a plan view of the brake unit removed from the differential of Fig. 1 with parts broken away and in section.
Figure 3:
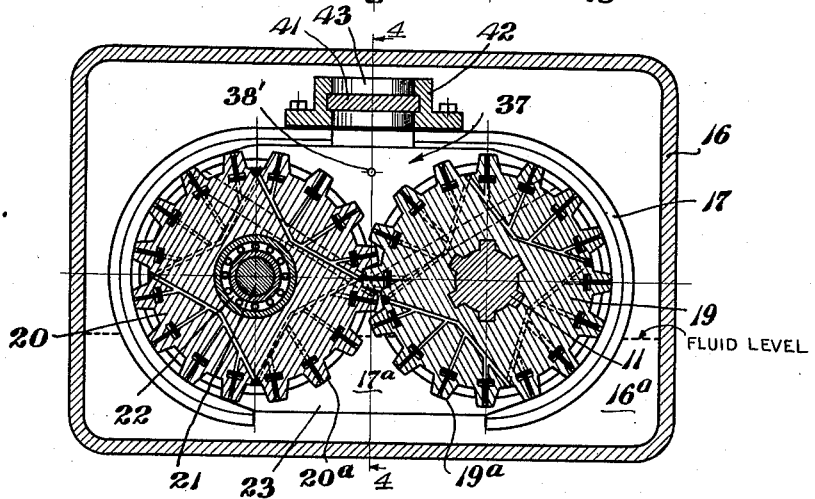
Fig. 3 is a section taken substantially on the line 3—3 of Fig. 2.
Figure 4:
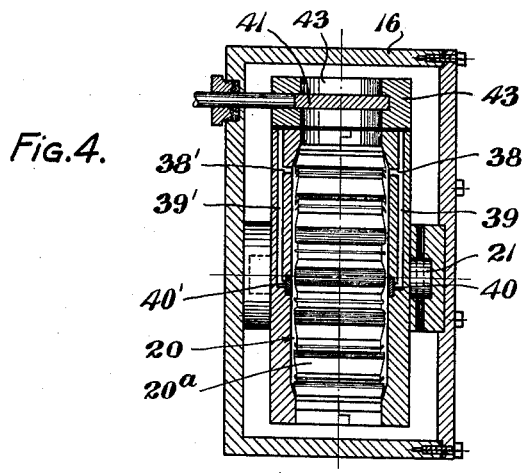
Fig. 4 is a section taken on the line 4—4 of Fig. 3.

The improved internal resistance fluid brake is particularly adapted for service with heavy duty vehicles, such as trucks and the like, and is so illustrated in the present instance. However, it will be understood that it may be used with any type of vehicle or apparatus wherein it is desired to apply a braking action to a rotating or moving part.

Referring to the drawings in detail, a differential housing is generally indicated at 10 and has projecting thereinto a drive shaft 11 having secured on the rear end thereof a drive pinion 12 in mesh with a ring gear 13 which drives axle shafts 14 through differential 15. As will be understood, the drive shaft 11 projects forwardly to the transmission housing of the vehicle to receive power applied from a motor, not shown.

Connected to the differential housing 10 is a housing 16 defining a fluid chamber or reservoir 16$^a$, and within the chamber 16$^a$ is a gear case or housing 17 defining a pump or impeller chamber 17$^a$, the drive shaft projecting through housing 16 and gear case 17 and provided with bearings 18. Splined on the drive shaft 11 within the case 17 is a pump or impeller gear 19 in mesh with a coacting pump gear 20, said gears being provided with teeth 19$^a$ and 20$^a$. These gears are of substantiallly the same construction with the exception that the gear 20 is mounted on a stub shaft 21 secured at opposite ends in the gear case 17, suitable bearings 22 being provided for the gear 20. The lower part of the pump chamber is open as at 23, and oil or other suitable fluid is maintained at a suitable level in the chambers 16$^a$ and 17$^a$.

Figure 5:
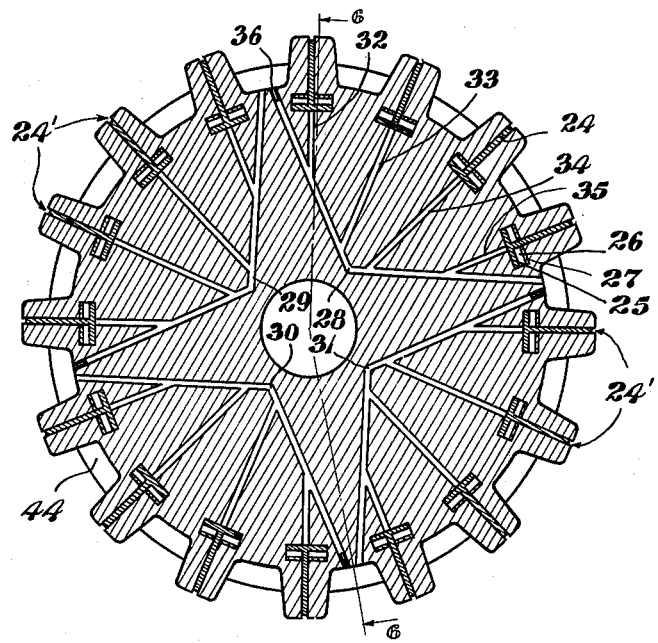
Fig. 5 is a substantially vertical section taken through one of the pump gears.
Figure 6:
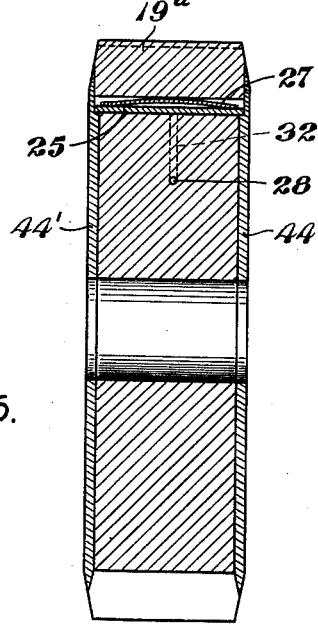
Fig. 6 is a section taken on the line 6—6 of Fig. 5.

Each of the gears 19 and 20 is provided with coacting bypass channels or ducts in substantially the same manner. Each tooth of each gear is formed with a guide slot 24' and mounted in this slot is a radially movable vane 24, the inner end of the vane being formed with a T head 25 which is mounted for limited movement in a chamber 26. Leaf springs 27, note particularly Figs. 5 and 6, are mounted in the space 26 and exert pressure on the T heads 25 to normally retract the vanes 24 radially inwardly.

The vanes 24 are forced outwardly into sealing contact with the adjacent inner wall of the gear housing 17 by fluid pressure which is applied when the gears rotate to a predetermined angular position through a system of ducts 28, 29, 30 and 31 which in turn feed or communicate radially outwardly to the respective chambers 26 through ducts 32, 33, 34 and 35. The ducts 28, 29, 30 and 31 are each plugged at one end as indicated at 36, so that when fluid under pressure is applied at the opposite end, it is communicated to the T heads 25 of the vanes 24, forcing the latter outwardly in their guide slots 24'.

The area in the pump or impeller chamber 17 where the braking pressure is generated is indicated at 37, and from this area ducts 38, 38' are formed in the opposite side walls of the gear housing 17 and lead downwardly through ducts 39 and 39' to a point where they communicate pressure to sealing members in the form of generally V-shaped strips 40 and 40' which are mounted for limited movement so that they will be forced inwardly against the opposite sides of the gears 19 and 20 at the lower boundary of the pressure area 37 and seal against leakage at this point when pressure is built up in the said area. These strips 40, 40' have a function comparable to the piston rings for pistons of an internal combustion engine.

Pressure in the area 37 is controlled by means of a valve 41 mounted in a cage or valve housing 42 formed with a relief port or passage 43 so that fluid may pass from or circulate between the area 37 and the fluid chamber 16ª. This valve 41 may be of any suitable construction and may be controlled by an operator or driver of the vehicle to which the brake is applied through suitable linkage mechanism, not shown, or the control may be electrical, hydraulic or by any other suitable means.

Each of the gears 19 and 20 is provided with side plates 44 and 44' which provide retaining means for the vanes 24 and springs 27. These plates may be removably secured to the gears so that the entire unit is rendered demountable.

A relief valve 45 may be provided for the pressure area or chamber 37.

The brake operates as follows:

The gears 19 and 20 rotate in reverse directions, and as rotation takes place, the teeth of the gears pick up oil in the pump or impeller chamber which is carried around by said teeth into the pressure chamber or area 37. Pressure in this chamber is controlled by the valve 41 so that as long as this valve is open or partly open, the oil or other fluid will bypass or circulate from area 37 through the port 43 back into the main oil chamber or reservoir 16ª. However, when the valve 41 is moved toward or to closed position, passage of oil through the port 43 is prevented or retarded with the result that pressure is built up in the area 37. As pressure builds up in this area, oil is forced into the respective ducts 28—31 as the entrance ends of the latter move into the pressure area, the oil from these ducts being forced outwardly through the branch ducts 32—35 into the vane chambers 26 and exerting pressure on the T heads 25 of the vanes 24, forcing the latter radially outwardly into sealing contact with the inner surface of the housing 17. This surface may be lined with suitable wear-resistant material if desired. When the entrance ends of the respective ducts 28—31 rotate out of the pressure area, pressure on the vanes is released, whereupon the springs 27 retract the vanes radially inwardly within their guide slots to thereby reduce friction loss, especially when the pump is idling. At the point where the teeth of the gears 19 and 20 mesh, there is also a highly effective seal. The pressure thrust on the teeth of the gears 19 and 20 will be primarily in opposition to rotation of the gears. It will thus be seen that practically unlimited pressure may be built up in the chamber or area 37 depending upon whether or not the valve 41 is fully or only partly closed, and this pressure is effectively sealed against leakage by the vanes 24 and the sealing members 40, the sealing pressure on these vanes and members being in direct proportion to the pressure build up in the chamber 37.

It will be understood that no attempt has been made herein to show the exact relative dimensions of gears and teeth and other mechanical parts, or the capacities of the pressure ducts by means of which pressure is applied to the sealing vanes 24 and members 40. It will thus be obvious that the drawings are only illustrative of the invention, and that various changes in construction, dimensions and design of the respective parts to adapt the brake to different uses and capacities may be adopted at will without departing from the spirit or scope of the invention as defined by the appended claims.

What is claimed is:

1. In an internal resistance rotary gear type fluid brake, intermeshing pump gears, a pump chamber in which said gears are mounted provided with a wall contiguous to the teeth of the gears, means for rotating said gears to generate pressure in an area in said pump chamber, radially movable sealing members carried by said gears and adapted for sealing engagement with said wall, additional sealing members disposed in the side walls of the said chamber and movable against the sides of the gears, and means for communicating pressure generated by said gears in said area to said radially movable sealing members and said side sealing members to force certain of said radially movable sealing members into sealing engagement with said wall during rotation of the gears and simultaneously force said side sealing members into sealing contact with the sides of the gears.

2. In an internal resistance rotary gear type fluid brake, intermeshing pump gears, a pump chamber in which said gears are mounted provided with a wall contiguous to the teeth of said gears and also having side walls adjacent the sides of said gears, means for rotating said gears to generate pressure in an area in said pump chamber, radially movable vanes carried by said gears and adapted for sealing contact with said wall, additional sealing members mounted in the side walls of said chamber and adapted for limited inward movement against the side walls of said gears, said latter sealing members defining a boundary of the pressure chamber, and ducts for communicating fluid pressure to said vanes and to said sealing members and whereby pressure is exerted on said vanes and members during rotation of said gears in direct proportion to the pressure built up in said chamber.

3. In an internal resistance rotary gear type fluid brake, intermeshing pump gears, a pump chamber in which said gears are mounted provided with a wall contiguous to the teeth of the gears and side walls adjacent the sides of the gears, a fluid reservoir, means for rotating said gears in opposite directions to propel fluid from said reservoir into the pump chamber and build up pressure in an area in the latter chamber, a port permitting circulation of fluid from said pressure area to said reservoir and a valve controlling said port, radially movable sealing vanes mounted on said gears and adapted for sealing contact with the adjacent wall of the pressure chamber and additional sealing members mounted adjacent the opposite sides of the gears at the lower boundary of the pressure area, means for communicating pressure from said pressure area to said vanes and also to said side sealing members to respectively move certain of the vanes outwardly into sealing relation with the contiguous wall of the chamber and simultaneously move said side sealing members against the sides of the gears.

4. In an internal resistance rotary gear type fluid brake, a housing defining a fluid reservoir, another housing mounted in said first named housing and defining a pump chamber, gears rotatably mounted in said chamber and having intermeshing teeth, means for rotating said gears in reverse directions to propel fluid from said reservoir into said pump chamber to build up pressure in an area in the pump chamber, radially movable vanes mounted on the teeth of said gears and adapted for sealing contact with the adjacent wall of the pump chamber and additional elongated sealing strips movably mounted in the side walls of the pump chamber for contact with the side walls of the gears to seal the lower boundary of the pressure area, and ducts respectively formed in the gears and side walls of the pump chamber for communicating pressure to said vanes and also to the said sealing strips and whereby when pressure is generated in said area certain of said vanes are forced outwardly into contact with the adjacent wall of the chamber and said sealing strips are simultaneously forced against the sides of the gears.

5. In an internal resistance rotary gear type fluid brake, a housing defining a reservoir, another housing mounted in said first named housing and defining a pump chamber in communication with said reservoir, gears rotatably mounted in said pump housing, means for rotating said gears in reverse direction to propel fluid from said reservoir into said pump chamber and build up pressure in a restricted area in said latter chamber, a port communicating the pressure area with said reservoir and a valve controlling said port, said gears having intermeshing teeth provided with radial guide slots, radially movable sealing vanes mounted in said guide slots and adapted to be projected into contact with the adjacent wall of the pump chamber, side sealing strips mounted in the side walls of the pump chamber for limited movement into contact with the adjacent sides of the gears at the lower boundary of the pressure area, said gears being formed with ducts communicating said pressure area with the said vanes and said side walls of the pump chamber being provided with additional ducts communicating said area with said sealing strips and whereby when pressure is generated in said area certain of the vanes are forced radially outwardly against the contiguous walls of the pump chamber and said strips are simultaneously forced upwardly against the sides of the gears.

6. In an internal resistance rotary gear type fluid brake, a pump chamber in which said gears are mounted provided with side walls adjacent the sides of the gears, means for rotating said gears to buid up pressure in an area in the pump chamber, sealing strips movably mounted in the side walls of the pump chamber and defining a boundary of the pressure area, and ducts communicating said pressure area with the rear of said strips and whereby when pressure is generated in said area said strips are forced inwardly into sealing contact with the sides of the rotating gears.

7. In an internal resistance rotary gear type fluid brake, intermeshing pump gears, a chamber in which said gears are mounted provided with a wall contiguous to the teeth of the gears, means for rotating the gears to build up pressure in an area in the pump chamber, said gears being formed with guide slots and a chamber at the base of said slots, a sealing vane mounted for radial movement in each of said slots and projecting into the chamber at the base of the slot, said gears being also formed with ducts communicating said pressure area with the chambers at the base of each slot and whereby when said ducts move into said pressure area fluid under pressure is forced into the ducts and thence exerted on said vanes to force the latter outwardly into sealing contact with said wall.

8. An internal resistance rotary gear type fluid brake comprising in combination with the drive shaft of a vehicle, a housing defining a fluid reservoir, another housing mounted in said reservoir and defining a pump chamber in communication with the reservoir, gears mounted in said pump chamber and having intermeshing teeth, one of said gears being secured on said shaft and whereby the gears are driven in opposite directions to propel fluid from said reservoir to said pump chamber and built up pressure in an area in said chamber, the teeth of said gears being slotted and formed with a chamber at the base of each slot, sealing vanes mounted for limited radial movement in said slots and having T heads disposed in said chambers, said gears being also formed with ducts for communicating fluid under pressure from said pressure area to the chambers at the bases of said vanes, the side walls of the pump chamber being formed with elongated slots, sealing strips mounted in said latter slots for limited movement inwardly against the sides of the gears, the side walls of the pump chamber being also formed with ducts communicating fluid under pressure from said pressure area to the slots in the rear of said strips and whereby when pressure is generated in said pressure area it is communicated to certain of said vanes to force the latter radially outwardly into sealing contact with the adjacent wall of the pump chamber and also to said elongated slots to force the sealing strips into contact with the sides of the gears.

9. A rotary gear type fluid pump comprising a housing defining a fluid reservoir, another housing mounted in said first-named housing and defining a pump chamber in communication with the reservoir, gears rotatably mounted in said chamber, means for rotating said gears in reverse direction to build up pressure in an area in the pump chamber, radially movable sealing vanes mounted on said gears for contact with the adjacent wall of said chamber, additional sealing members mounted in the side walls of said gear case for movement inwardly against the side walls of said gears to seal a boundary of the pressure area, and ducts respectively formed in said gears and in the side walls of said pump chamber for communicating fluid under pressure from said area to certain of said vanes and also to said sealing members to seal said pressure area.

10. A rotary gear type fluid pump comprising a fluid reservoir, a pump chamber in communication with said reservoir, intermeshing pump gears mounted in said chamber, means for rotating said gears in reverse directions to propel fluid from said reservoir to the pump chamber and build up pressure in an area in said chamber, radially movable vanes carried by said gears and adapted to be projected into sealing contact with the contiguous wall of the pump chamber, means for communicating pressure from said pressure area to said vanes when said gears rotate to a predetermined angular position within said area, and means for retracting said vanes after pressure is relieved therefrom.

11. In an internal resistance rotary gear type fluid brake, intermeshing pump gears, a chamber in which said gears are mounted provided with a wall contiguous to the teeth of the gears, means for rotating the gears to build up pressure in an an area in the pump chamber, said gears being formed with guide slots and a chamber at the base of said slots, a sealing vane mounted for radial movement in each of said slots and projecting into the chamber at the base of the slot, said gears being also formed with ducts communicating said pressure area with the chambers at the base of each slot and whereby when said ducts move into said pressure area fluid under pressure is forced into the ducts and thence exerted on said vanes to force the latter outwardly into sealing contact with said wall, and springs mounted in the slot chambers and acting to retract said vanes in their slots when pressure is relieved therefrom.

12. In an internal resistance rotary gear type fluid brake, gears having intermeshing teeth, housing means providing a fluid reservoir and a pressure chamber, means for rotating said gears in reverse directions to propel fluid from the reservoir to the pressure chamber, a valve controlling circulation of fluid between said chamber and reservoir, the boundary of said pressure chamber being defined in part by the peripheries of said gears and in part by a wall of said housing means, radially movable sealing members carried by said gears, a system of ducts arranged to communicate pressure from said pressure chamber simultaneously to a plurality of the sealing members of each gear and urge the latter into sealing contact with said wall during part of one revolution of said gears and to close off communication from said chamber and relieve pressure from said members during the remaining part of the revolution.

13. In an internal resistance rotary gear type fluid brake, a pair of gears having intermeshing teeth, housing means providing a fluid reservoir and a pressure chamber, a port communicating said chamber with said reservoir and a valve controlling said port, means for rotating said gears in reverse directions to propel fluid from the reservoir to the pressure chamber, the boundary of said pressure chamber being defined in part by the peripheries of said gears and in part by a wall of said housing means, sealing vanes mounted for radial movement in said gears, said gears each being provided with a plurality of ducts formed in the gear body having inlets arranged to communicate pressure from the pressure chamber to a plurality of said vanes to drive the latter radially outwardly into sealing position with respect to said wall during part of one revolution of said gears and close off communication from said chamber and relieve pressure from said vanes during the remaining part of the revolution.

14. In an internal resistance rotary gear type fluid brake, a pair of intermeshing gears, housing means providing a fluid reservoir and a pressure chamber, a port communicating the pressure chamber with the reservoir and a valve controlling said port, said housing means including a wall located adjacent the peripheries of said gears, radially movable sealing vanes mounted in the peripheries of said gears for sealing contact with said wall, said gears being provided with a plurality of ducts, there being separate ducts each controlling a plurality of vanes having inlets so located that when they are presented to the pressure chamber the vanes controlled thereby will be forced outwardly under fluid pressure against said wall and when said inlets move beyond the range of the pressure chamber their associated vanes will be relieved of pressure to reduce loss in efficiency due to unnecessary friction.

WILLIAM H. REA.
ARTHUR WM. WEEKS.